United States Patent
May

(10) Patent No.: US 6,286,557 B1
(45) Date of Patent: Sep. 11, 2001

(54) SHEATH

(75) Inventor: Peter Andrew John May, Bullsbrook (AU)

(73) Assignee: Spiral Guard Australia Pty. Ltd., Bullsbrook (AU)

( * ) Notice: Subject to any disclaimer, the term of this patent is extended or adjusted under 35 U.S.C. 154(b) by 0 days.

(21) Appl. No.: 09/646,055

(22) PCT Filed: Mar. 11, 1999

(86) PCT No.: PCT/AU99/00159

§ 371 Date: Sep. 11, 2000

§ 102(e) Date: Sep. 11, 2000

(87) PCT Pub. No.: WO99/46534

PCT Pub. Date: Sep. 16, 1999

(30) Foreign Application Priority Data

Mar. 12, 1998 (AU) .................................. PP 2282

(51) Int. Cl.$^7$ ....................................... F16L 11/00
(52) U.S. Cl. ............... 138/110; 138/129; 138/131; 138/150
(58) Field of Search .................... 138/110, 129, 138/130, 131, 144, 150

(56) References Cited

U.S. PATENT DOCUMENTS

| 3,299,908 | | 1/1967 | Petzetakis | 138/122 |
| 3,558,754 | | 1/1971 | Martin | 264/516 |
| 3,616,123 | * | 10/1971 | Reynolds, Jr. | 138/150 X |
| 4,587,145 | * | 5/1986 | Kanao | 138/132 X |
| 4,870,535 | | 9/1989 | Matsumoto | 361/215 |
| 5,862,030 | * | 1/1999 | Watkins, Jr. et al. | 361/103 |

FOREIGN PATENT DOCUMENTS

| 31 45 702 A | 5/1983 | (DE) . |
| 81 01227 | 4/1981 | (EP) . |
| 0 252 338 A | 1/1988 | (EP) . |

* cited by examiner

*Primary Examiner*—Patrick Brinson
(74) *Attorney, Agent, or Firm*—Duane, Morris Heckscher LLP

(57) ABSTRACT

A sheath for at least partially covering a tubular member, includes a helically wound strip having an electrically conductive portion extending through the strip from an inner surface of the strip to an outer surface of the strip. The conductive portion also extends continuously substantially helically along at least part of the length of the sheath. The sheath, and in particular the strip, may be formed from a flame retardant material.

13 Claims, 2 Drawing Sheets

SHEATH

FIELD OF THE INVENTION

The present invention relates to a sheath for at least partially covering a tubular member and, in particular, for covering a tubular member of the type commonly used in an underground mine.

BACKGROUND OF THE INVENTION

It is common in underground mines to provide mining machines with tubing for carrying hydraulic fluid or air. However, such tubing is subject to Australian Standards which specify, among other things, that the tubing should not exceed an average duration of flaming and glowing of thirty seconds (ie. should be flame retardant) and the electrical resistance of the tubing should not be greater than 1M$\Omega$/m.

SUMMARY OF THE INVENTION

The present invention seeks, among other things, to provide a sheath which, when combined with conventional tubing of the type used in an underground mine, provides a tube assembly which satisfies the above mentioned Australian Standards requirements.

In accordance with one aspect of the present invention there is provided a sheath for at least partially covering a tubular member, the sheath including a helically wound strip having an electrically conductive portion extending through the strip from an inner surface of the strip to an outer surface of the strip, the said conductive portion extending continuously substantially helically along at least part of the length of the sheath.

BRIEF DESCRIPTION OF DRAWINGS

The present invention will now be described by way of example with reference to the accompanying drawings in which.

DETAILED DESCRIPTION OF THE PREFERRED EMBODIMENT

Figure 1:
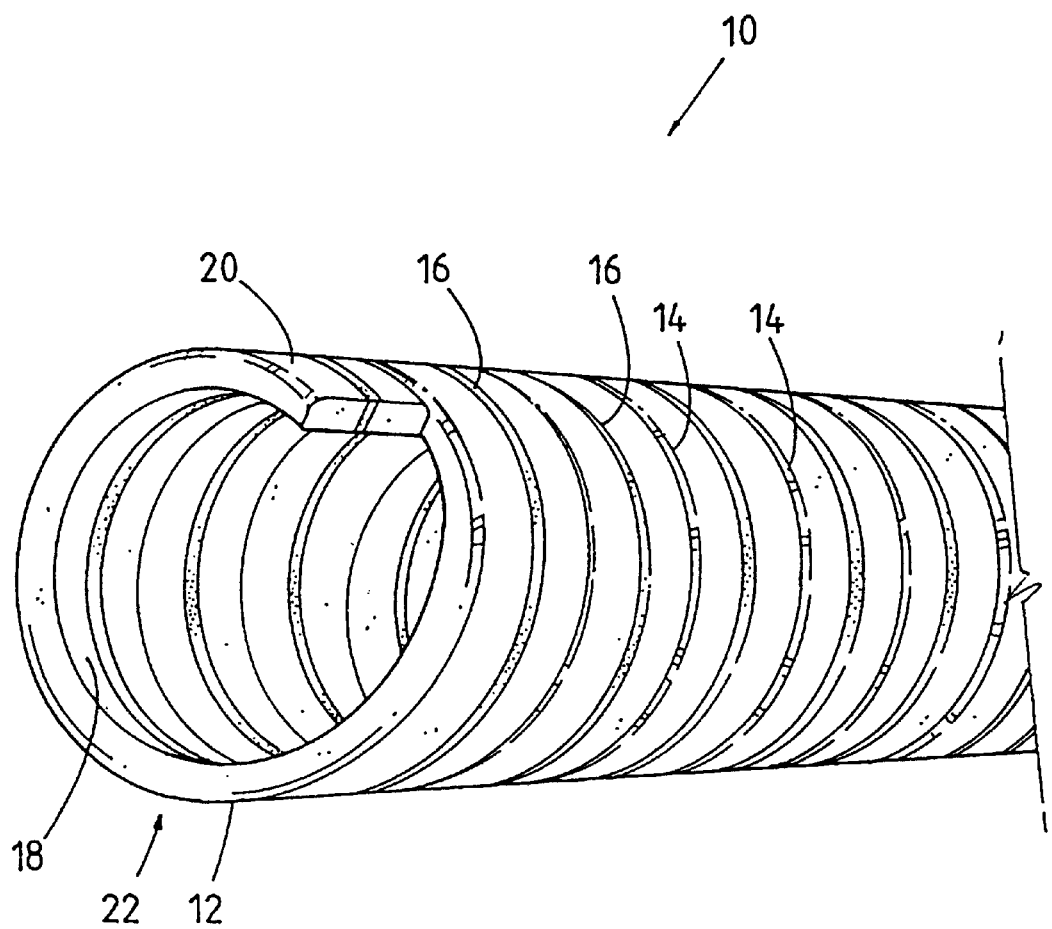
FIG. 1 is a diagrammatic perspective view of a sheath in accordance with the present invention.

Referring to FIG. 1, there is shown a sheath 10 for covering, in use, at least a portion of a tubular member which may be a tube carrying hydraulic fluid or air in a mine.

The sheath 10 is formed by helically winding an elongate strip 12 of flame retardant material, in this example, polyethylene, so as to form an elongate cylinder, the strip 12 being helically wound such that each turn of the helically wound strip is spaced from an adjacent turn by a gap 14. By forming the sheath 10 from a helically wound strip and providing a gap 14 intermediate adjacent turns of the helically wound strip, the sheath 10 is provided with sufficient flexibility to allow the sheath 10, in use, to conform with the curvature of a portion of a tube which is covered by the sheath 10.

The sheath 10 also includes an electrically conductive portion 16 which extends from an inner surface 18 of the sheath 10 to an outer surface 20 of the sheath 10. The electrically conductive portion 16 also extends helically from a first longitudinal end 22 of the sheath 10 to a second opposite longitudinal end (not shown) of the sheath 10. The arrangement is such that when, in use, a portion of a tube is covered by the sheath 10, an electrical connection is made between an outer surface of the tube and a portion of the electrically conductive portion 16 on the inner surface 18 of the sheath 10. Since the electrically conductive portion 16 extends continuously along the length of the sheath, it follows that the electrical potential at the electrically conductive portion 16 is substantially constant between the first 22 and second longitudinal ends of the sheath 10. Generally, in use, the electrically conductive portion 16 and thereby the tube covered by the sheath 10 is substantially at ground potential by virtue of an electrical connection which is made by a portion of the electrically conductive portion 16 on the outer surface 20 of the sheath 10 touching a portion of, for example, a mining machine on which the tube is located. However, it will be understood that, if necessary, an electrical link could be connected between the electrically conductive portion and ground.

In this example, the electrically conductive portion 16 is a mixture of high density polyethylene plastics material and particulate carbon, the strip 12 being formed by coextruding the high density polyethylene and carbon mixture with polyethylene so as to form a polyethylene strip having an electrically conductive portion extending along the length of the strip. Preferably, the thickness of the electrically conductive portion 16 is approximately 1 mm.

Where the electrically conductive portion 16 is formed of a material which is flammable, the strip 12 may also include an additive material in addition to the flame retardant material or the strip 12 may wholly consist of a material which, when exposed to a fire situation, aids to extinguish flames emanating from the electrically conductive portion 16 within 30 seconds. Halide based compounds are suitable for this purpose.

It will be appreciated that instead of forming the strip 12 and the electrically conductive portion by a coextruding process, the helical strip 12 of the sheath 10 could be provided with an electrically conductive portion in any other suitable way, for example by stitching an electrically conductive thread along the length of the helix, the important aspect being that an electrical connection is made between inner and outer surfaces of the sheath and between the sheath 10 and the tubular member received in the sheath 10.

It will also be appreciated that the strip could include more than one electrically conductive portion along the length of the helical strip. However, where the electrically conductive portion is formed of a material which is flammable, the combined width of the outer surface 20 of the conductive portion 16 of the sheath 10 should be less than the area above which the electrically conductive portion is susceptible to resist flame extinction by a flame extinguishing material in the strip.

Figure 2:
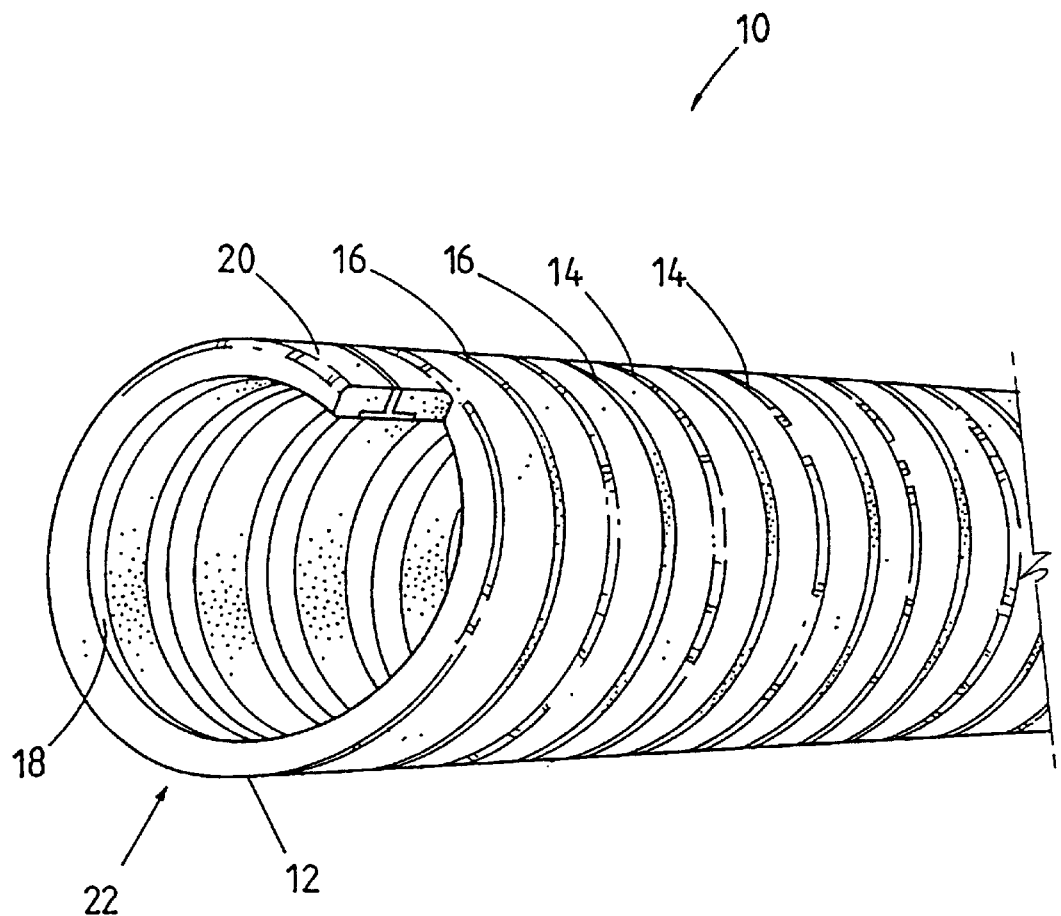
FIG. 2 is a diagrammatic perspective view of a sheath in accordance with an alternative embodiment of the present invention.

Furthermore, it will be appreciated that the transverse cross sectional area of the electrically conductive portion could be any shape, the important aspect being that an electrically conducting path is provided between the inner surface 18 and the outer surface 20 of the sheath 10. An example of an alternative embodiment of the sheath having an alternative shaped electrically conducting portion is shown in FIG. 2. Like features are indicated by like reference numerals. In this embodiment, the surface area of the conducting portion on the inner surface 18 of the sheath is greater than the surface area of the conducting portion on the outer surface 20 of the sheath. In this way, good electrical contact is ensured between the sheath and the tubular member received in the sheath.

Modifications and variations such as would be apparent to the skilled addressee are deemed to be within the scope of the present invention.

What is claimed is:

1. A sheath for at least partially covering a tubular member, wherein the sheath includes a helically wound strip having an electrically conductive portion extending through the strip from an inner surface of the strip to an outer surface of the strip, the strip being at least partially formed of a flame retardant material and the conductive portion extending continuously substantially helically along at least part of the length of the sheath.

2. A sheath as claimed in claim 1, wherein the flame retardant material includes polyethylene.

3. A sheath as claimed in claim 1, wherein the flame retardant material includes an additive material which, when the electrically conductive portion is formed of a flammable material, aids to extinguish flames emanating from the electrically conductive portion.

4. A sheath as claimed in claim 1, wherein the flame retardant material comprises a halide compound.

5. A sheath as claimed in claim 1, wherein the electrically conductive portion includes polyethylene and particulate carbon.

6. A sheath as claimed in claim 5, wherein the polyethylene is high density polyethylene.

7. A sheath as claimed in claim 1, wherein a plurality of said electrically conductive portions are provided.

8. A sheath as claimed in claim 1, wherein transverse cross-sectional area of the electrically conductive portion is substantially elongate rectangular shaped.

9. A sheath as claimed in claim 8, wherein the width of the transverse cross-sectional area of the electrically conductive portion is approximately 1 mm.

10. A sheath as claimed in claim 1, wherein the transverse cross-sectional area of the electrically conductive portion is substantially T-shaped.

11. A sheath as claimed in claim 1, wherein the sheath is formed by co-extruding the strip with electrically conductive material.

12. A sheath as claimed in claim 1, wherein the sheath is formed by stitching electrically conductive material into the strip.

13. A sheath as claimed in claim 1, wherein the strip is helically wound such that each turn of the strip is spaced from an adjacent turn by a gap.

* * * * *